US009845191B2

(12) United States Patent
Schwartz et al.

(10) Patent No.: US 9,845,191 B2
(45) Date of Patent: Dec. 19, 2017

(54) EJECTOR TRACK FOR REFUSE VEHICLE

(71) Applicant: Oshkosh Corporation, Oshkosh, WI (US)

(72) Inventors: Leslie Schwartz, Oshkosh, WI (US); Jason Gillmore, Oshkosh, WI (US); Shashank Bhatia, Oshkosh, WI (US); Jarud Hoefker, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 1175 days.

(21) Appl. No.: 13/958,308

(22) Filed: Aug. 2, 2013

(65) Prior Publication Data

US 2015/0033962 A1 Feb. 5, 2015

(51) Int. Cl.

| | |
|---|---|
| ***B65F 3/20*** | (2006.01) |
| ***B62D 25/02*** | (2006.01) |
| *B65F 3/00* | (2006.01) |
| *B65F 3/26* | (2006.01) |
| *B65F 3/28* | (2006.01) |

(52) U.S. Cl.

CPC ................ *B65F 3/201* (2013.01); *B65F 3/26* (2013.01); *B65F 3/28* (2013.01); *B65F 2003/006* (2013.01)

(58) Field of Classification Search

CPC .... B65F 3/201; B65F 3/26; B65F 3/28; B65F 3/14; B65F 3/143; B65F 2003/006; B65F 2003/0279

USPC .......................... 100/218, 269.17; 296/186.1

See application file for complete search history.

(56) References Cited

U.S. PATENT DOCUMENTS

| | | | | | |
|---|---|---|---|---|---|
| 2,179,726 | A * | 11/1939 | Lewis | B60P 1/38 | 298/1 B |
| 2,800,234 | A * | 7/1957 | Herpich | B60P 1/006 | 298/1 B |
| 2,911,119 | A * | 11/1959 | Kuhnau | B65F 3/28 | 298/1 B |

(Continued)

FOREIGN PATENT DOCUMENTS

| | | |
|---|---|---|
| CA | 2518690 | 9/2006 |
| CA | 2669342 | 11/2010 |

(Continued)

OTHER PUBLICATIONS

"Dana Spicer Central Tire Inflation System Specifications," Dana Corporation, Kalamazoo, Michigan, May 2000 (2 pgs.).

(Continued)

*Primary Examiner* — Jimmy T Nguyen

(74) *Attorney, Agent, or Firm* — Foley & Lardner LLP

(57) ABSTRACT

An ejector for a refuse vehicle including a structural frame, a first shoe, and a second shoe. The structural frame includes a first side plate offset from a second side plate, and the distance between the first side plate and the second side plate defines a side plate spacing. The first shoe is coupled to the first side plate and includes a first surface configured to interface with a first ejector track. The second shoe is coupled to the second side plate and includes a second surface configured to interface with the second ejector track. A lateral spacing between the first surface and the second surface is less than or equal to the side plate spacing such that loading imparted on the structural frame is transmitted directly into the first ejector track and the second ejector track.

14 Claims, 7 Drawing Sheets

(56) References Cited

U.S. PATENT DOCUMENTS 3,486,646 A * 12/1969 McCarthy ................. B65F 3/28 180/254
3,720,863 A 3/1973 Ringland et al.
3,729,106 A 4/1973 Barbieri
3,899,090 A * 8/1975 Telesio ...................... B65F 3/28 100/229 A
4,041,470 A 8/1977 Slane et al.
4,162,714 A 7/1979 Correll
4,162,735 A 7/1979 Lewis
4,180,803 A 12/1979 Wesemeyer et al.
4,355,385 A 10/1982 Hampshire et al.
4,453,880 A 6/1984 Leisse
4,516,121 A 5/1985 Moriyama et al.
4,542,802 A 9/1985 Garvey et al.
RE32,140 E 5/1986 Tokuda et al.
4,639,609 A 1/1987 Floyd et al.
4,646,232 A 2/1987 Chang et al.
4,744,218 A 5/1988 Edwards et al.
4,760,275 A 7/1988 Sato et al.
4,809,177 A 2/1989 Windle et al.
4,809,803 A 3/1989 Ahern et al.
4,842,326 A 6/1989 DiVito
4,843,557 A 6/1989 Ina et al.
4,864,151 A 9/1989 Wyczalek et al.
4,864,154 A 9/1989 Copeland et al.
4,864,568 A 9/1989 Sato et al.
4,894,781 A 1/1990 Sato et al.
4,941,546 A 7/1990 Nist et al.
4,949,808 A 8/1990 Garnett
5,025,253 A 6/1991 DiLullo et al.
5,062,759 A 11/1991 Pieperhoff
5,071,307 A 12/1991 Carson
5,091,856 A 2/1992 Hasegawa et al.
5,189,617 A 2/1993 Shiraishi
5,202,830 A 4/1993 Tsurumiya et al.
5,215,423 A 6/1993 Schulte-Hinsken et al.
5,222,853 A 6/1993 Carson
5,299,129 A 3/1994 Uchida et al.
5,301,997 A 4/1994 Cudden
5,314,290 A 5/1994 Lutz et al.
5,343,675 A 9/1994 Norton
5,365,436 A 11/1994 Schaller et al.
5,416,702 A 5/1995 Kitagawa et al.
5,418,437 A 5/1995 Couture et al.
5,463,992 A 11/1995 Swenson et al.
5,470,187 A 11/1995 Smith et al.
5,484,245 A 1/1996 Zopf
5,508,689 A 4/1996 Rado et al.
5,540,037 A 7/1996 Lamb et al.
5,553,673 A 9/1996 Hackman
5,555,171 A 9/1996 Sonehara et al.
5,557,257 A 9/1996 Gieffers
5,568,023 A 10/1996 Grayer et al.
5,595,398 A 1/1997 Brown
5,601,392 A 2/1997 Smith et al.
5,623,169 A 4/1997 Sugimoto et al.
5,637,933 A 6/1997 Rawlings et al.
5,638,272 A 6/1997 Minowa et al.
5,651,654 A 7/1997 Christenson
5,657,224 A 8/1997 Lonn et al.
5,670,845 A 9/1997 Grant et al.
5,673,017 A 9/1997 Dery et al.
5,700,026 A 12/1997 Zalewski et al.
5,736,925 A 4/1998 Knauff et al.
5,739,592 A 4/1998 Rigsby et al.
5,754,021 A 5/1998 Kojima
5,769,592 A 6/1998 Christenson
5,793,648 A 8/1998 Nagle et al.
5,794,165 A 8/1998 Minowa et al.
5,816,766 A 10/1998 Clark
5,819,188 A 10/1998 Vos
5,826,485 A 10/1998 Bayne et al.
5,827,957 A 10/1998 Wehinger
5,845,221 A 12/1998 Hosokawa et al.
5,848,365 A 12/1998 Coverdill
5,851,100 A 12/1998 Brandt
5,856,976 A 1/1999 Hirano
5,864,781 A 1/1999 White
5,884,206 A 3/1999 Kim
5,890,080 A 3/1999 Coverdill et al.
5,890,865 A 4/1999 Smith et al.
5,896,418 A 4/1999 Hamano et al.
5,919,237 A 7/1999 Balliet
5,931,628 A 8/1999 Christenson
5,948,025 A 9/1999 Sonoda
5,949,330 A 9/1999 Hoffman et al.
5,954,470 A 9/1999 Duell et al.
5,957,985 A 9/1999 Wong et al.
5,987,365 A 11/1999 Okamoto
5,997,338 A 12/1999 Pohjola
5,999,104 A 12/1999 Symanow et al.
6,012,004 A 1/2000 Sugano et al.
6,033,041 A 3/2000 Koga et al.
6,038,500 A 3/2000 Weiss
6,059,058 A 5/2000 Dower
6,059,511 A 5/2000 Anderson et al.
6,062,803 A * 5/2000 Christenson .............. B65F 3/28 384/7
6,065,565 A 5/2000 Puszkiewicz et al.
6,070,538 A 6/2000 Flamme et al.
6,075,460 A 6/2000 Minissale et al.
6,091,162 A 7/2000 Williams et al.
6,096,978 A 8/2000 Pohjola
6,123,497 A 9/2000 Duell et al.
6,135,806 A 10/2000 Pohjola
6,141,610 A 10/2000 Rothert et al.
6,152,673 A 11/2000 Anderson et al.
6,154,122 A 11/2000 Menze
6,158,945 A 12/2000 Anderson et al.
6,167,795 B1 1/2001 Bayne et al.
6,182,807 B1 2/2001 Saito et al.
6,210,094 B1 4/2001 McNeilus et al.
6,223,104 B1 4/2001 Kamen et al.
6,230,496 B1 5/2001 Hofmann et al.
6,263,269 B1 7/2001 Dannenberg
6,269,295 B1 7/2001 Gaugush et al.
6,323,565 B1 11/2001 Williams et al.
6,331,365 B1 12/2001 King
6,332,745 B1 12/2001 Duell et al.
6,338,010 B1 1/2002 Sparks et al.
6,356,826 B1 3/2002 Pohjola
6,404,607 B1 6/2002 Burgess et al.
6,405,114 B1 6/2002 Priestley et al.
6,421,593 B1 7/2002 Kempen et al.
6,430,164 B1 8/2002 Jones et al.
6,430,488 B1 8/2002 Goldman et al.
6,433,442 B1 8/2002 Maeckel et al.
6,434,512 B1 8/2002 Discenzo
6,482,124 B2 11/2002 Hormann et al.
6,496,775 B2 12/2002 McDonald, Jr. et al.
6,501,368 B1 12/2002 Wiebe et al.
6,522,955 B1 2/2003 Colborn
6,553,290 B1 4/2003 Pillar
6,565,305 B2 5/2003 Schrafel
6,580,953 B1 6/2003 Wiebe et al.
6,611,755 B1 8/2003 Coffee et al.
6,648,367 B2 11/2003 Breed et al.
6,732,035 B2 5/2004 Miller et al.
6,733,036 B2 5/2004 Breed et al.
6,757,597 B2 6/2004 Yakes et al.
6,761,370 B2 7/2004 Colet
6,865,460 B2 3/2005 Bray et al.
6,882,917 B2 4/2005 Pillar et al.
6,885,920 B2 4/2005 Yakes et al.
6,909,944 B2 6/2005 Pillar et al.
6,917,288 B2 7/2005 Kimmel et al.
6,922,615 B2 7/2005 Pillar et al.
6,928,358 B2 8/2005 Brooks et al.
6,993,421 B2 1/2006 Pillar et al.
7,006,902 B2 2/2006 Archer et al.
7,024,296 B2 4/2006 Squires et al.
7,072,745 B2 7/2006 Pillar et al.
7,086,818 B2 8/2006 Pruteanu et al.
7,107,129 B2 9/2006 Rowe et al.

(56) References Cited

U.S. PATENT DOCUMENTS

| | | | |
|---|---|---|---|
| 7,127,331 B2 | 10/2006 | Pillar et al. | |
| 7,162,332 B2 | 1/2007 | Pillar et al. | |
| 7,164,977 B2 | 1/2007 | Yakes et al. | |
| 7,184,862 B2 | 2/2007 | Pillar et al. | |
| 7,184,866 B2 | 2/2007 | Squires et al. | |
| 7,254,468 B2 | 8/2007 | Pillar et al. | |
| 7,277,782 B2 | 10/2007 | Yakes et al. | |
| 7,302,320 B2 | 11/2007 | Nasr et al. | |
| 7,559,735 B2 | 7/2009 | Pruteanu et al. | |
| 7,563,066 B2 | 7/2009 | Jones et al. | |
| 7,725,225 B2 | 5/2010 | Pillar et al. | |
| 8,182,194 B2 | 5/2012 | Pruteanu et al. | |
| 2002/0112688 A1 | 8/2002 | Fariz et al. | |
| 2003/0031543 A1 | 2/2003 | Elbrink | |
| 2003/0085562 A1 | 5/2003 | Sparling | |
| 2003/0151526 A1 | 8/2003 | Tanaka et al. | |
| 2003/0156020 A1 | 8/2003 | Masuda | |
| 2003/0158635 A1 | 8/2003 | Pillar et al. | |
| 2003/0165255 A1 | 9/2003 | Yanagawa et al. | |
| 2003/0195680 A1 | 10/2003 | Pillar | |
| 2003/0200015 A1 | 10/2003 | Pillar | |
| 2003/0205422 A1 | 11/2003 | Morrow et al. | |
| 2004/0055802 A1 | 3/2004 | Pillar et al. | |
| 2004/0124697 A1 | 7/2004 | MacGregor et al. | |
| 2004/0133319 A1 | 7/2004 | Pillar et al. | |
| 2004/0199302 A1 | 10/2004 | Pillar et al. | |
| 2005/0004733 A1 | 1/2005 | Pillar et al. | |
| 2005/0038934 A1 | 2/2005 | Gotze et al. | |
| 2005/0050872 A1 | 3/2005 | Kempf | |
| 2005/0113996 A1 | 5/2005 | Pillar et al. | |
| 2005/0119806 A1 | 6/2005 | Nasr et al. | |
| 2005/0131600 A1 | 6/2005 | Quiqley et al. | |
| 2005/0135910 A1* | 6/2005 | Pruteanu | B65F 3/201 414/517 |
| 2005/0234622 A1 | 10/2005 | Pillar et al. | |
| 2006/0201121 A1 | 9/2006 | Straka et al. | |
| 2006/0226675 A1 | 10/2006 | Dunn | |
| 2007/0172341 A1 | 7/2007 | Gregory | |
| 2007/0251737 A1 | 11/2007 | Straka et al. | |
| 2008/0027599 A1 | 1/2008 | Logan et al. | |
| 2008/0100704 A1 | 5/2008 | Venetianer et al. | |
| 2008/0137589 A1 | 6/2008 | Barrett | |
| 2009/0109049 A1 | 4/2009 | Frederick et al. | |
| 2012/0282077 A1 | 11/2012 | Alberts et al. | |
| 2013/0251485 A1 | 9/2013 | Howell et al. | |

FOREIGN PATENT DOCUMENTS

| | | |
|---|---|---|
| DE | 40 41 483 A1 | 6/1992 |
| DE | 101 03 922 A1 | 8/2002 |
| EP | 0 496 302 A1 | 7/1992 |
| EP | 0 504 913 A1 | 9/1992 |
| EP | 0 266 704 B1 | 6/1993 |
| EP | 0 630 831 A1 | 12/1994 |
| EP | 0 791 506 A2 | 8/1997 |
| EP | 0 894 739 A1 | 2/1999 |
| EP | 0 564 943 B1 | 6/2001 |
| EP | 1 229 636 A2 | 8/2002 |
| EP | 1 594 770 | 11/2005 |
| EP | 1 667 924 | 6/2006 |
| SE | 507046 C2 | 3/1998 |
| WO | WO-93/10591 A1 | 5/1993 |
| WO | WO-93/10951 A1 | 6/1993 |
| WO | WO-95/15594 A1 | 6/1995 |
| WO | WO-96/32346 A1 | 10/1996 |
| WO | WO-96/40573 A1 | 12/1996 |
| WO | WO-97/02965 A1 | 1/1997 |
| WO | WO-98/30961 A1 | 7/1998 |
| WO | WO-00/69662 A1 | 11/2000 |
| WO | WO-2004/052756 A1 | 6/2004 |
| WO | WO-2005/030614 A1 | 4/2005 |

OTHER PUBLICATIONS

"HEMTT—Heavy Expanded Mobility Tactical Truck M977 Series Truck," Product of Oshkosh Truck Corporation, Mar. 2000 (12 pgs. as photocopied).

"LHS Decontamination Mission Module," Product of Oshkosh Truck Corporation, see IDS for date (2 pgs. as photocopied).

"LVS Logistic Vehicle System (MK48 Series)," Product of Oshkosh Truck Corporation, see IDS for date information (6 pgs.).

"M1070F Heavy Equipment Transporter & Trailer"; Product of Oshkosh Truck Corporation, Sep. 2001 (8 pgs. as photocopied).

"M1977 CBT (Common Bridge Transporter)," Product of Oshkosh Truck Corporation, see IDS for date information (2 pgs. as photocopied).

"Medium Tactical Vehicle Replacement," Product of Oshkosh Truck Corporation, Aug. 2000 (6 pgs. as photocopied).

"MTVR Dump Body Variant (Medium Tactical Vehicle Replacement)," Product of Oshkosh Truck Corporation, Sep. 2001 (2 pgs. as photocopied).

"MTVR Wrecker Variant (MK36 Wrecker Recovery Vehicle)," Product of Oshkosh Truck Corporation, Sep. 2001 (2 pgs. as photocopied).

"Oshkosh Demonstrates ProPulse, the First Electric Hybrid-Drive Heavy Defense Truck," Oshkosh Truck Corp., Feb. 27, 2000 (2 pgs.).

"Oshkosh Receives Federal Government Funding to Develop ProPulse Alternative Drive System for Military Trucks," Oshkosh Truck Corp., Aug. 31, 2001 (2 pgs.).

"Oshkosh Showcases ProPulse Hybrid Electric System at Major Defense Exhibition," Oshkosh Truck Corp., Oct. 21, 2002 (1 pg.).

"Oshkosh Truck and Ohio State University Design Robotic Vehicle to Compete in Desert Race," Oshkosh Truck Corp., Feb. 11, 2004 (2 pgs.).

"Oshkosh Truck Awarded Contract for U.S. Army Future Tactical Truck Concepts and Technology Evaluations," Oshkosh Truck Corp., Dec. 2, 2003 (2 pgs.).

"Oshkosh Truck Rolls Out Next Generation of Command Zone Advanced Electronics System to Military Market," Oshkosh Truck Corp., Oct. 21, 2002 (2 pgs.).

"Oshkosh Trucks—75 Years of Specialty Truck Production," Wright et al., Motorbooks International Publishers & Wholesalers, 1992, pp. 119-126 (10 pgs.).

"Oshkosh Truck's Robotic Truck Qualifies for Pentagon's $1 Million Desert Race," Oshkosh Truck Corp., Mar. 12, 2004 (2 pgs.).

"Palletized Load System (PLS)—Concrete Mobile Mixer Module," Product of Oshkosh Truck Corporation, see IDS for date information (2 pgs.).

"Palletized Load System (PLS) Potable Water Distributor Module," Product of Oshkosh Truck Corporation, see IDS for date information (2 pgs.).

"The One to Count on Through Hell and High Water," Product of Oshkosh Truck Corporation, Sep. 2000 (4 pgs.).

Aircraft Internal Time Division Multiplex Data Bus, MIL-STD-1553 (USAF), Aug. 30, 1973 (29 pgs.).

Instruction and Parts Manual, Machine type: GCB 1000 SPLIT, May 23, 2002, 80 pages, Geesink Norba Group.

Instruction and Parts Manual, Machine type: GPM IIe, Jul. 10, 2002, 74 pages, Geesink Norba Group.

Instruction Manual for the Training AS-i bus, Aug. 2002, 31 pages, Version 3.0, Geesink Norba Group.

* cited by examiner

EJECTOR TRACK FOR REFUSE VEHICLE

BACKGROUND

Refuse vehicles collect a wide variety of waste, trash, and other material from residences and businesses. Operators use the refuse vehicle to transport the material from various waste receptacles within a municipality to a storage or processing facility (e.g., a landfill, an incineration facility, a recycling facility, etc.). To reduce the requisite number of trips between the waste receptacles and the storage or processing facility, the refuse may be emptied into a collection chamber (e.g., a hopper) of the refuse vehicle and thereafter compacted. Such compaction reduces the volume of the refuse and increases the carrying capacity of the refuse vehicle. The refuse is compacted in the collection chamber by an ejector that is forced against the refuse by actuators (e.g., pneumatic cylinders, hydraulic cylinders). To keep the ejector aligned with the walls of the collection chamber, portions of the ejector are constrained by tracks or rails.

Traditionally, an ear on each side of the ejector slides within a "C" channel formed along the collection chamber. Compacting forces and forces due to the weight of the ejector are applied at the interface between the ear and the ejector. However, the ear is supported by the body of the refuse vehicle in a location laterally outward from the interface between the ear and the ejector. The application of forces laterally inward from the "C" channel produces a cantilever loading arrangement, which increases the stresses on the ear, the ejector, and the vehicle body. The structural elements of these components (e.g., the plates, gussets, etc.) must be sized to carry this increased load, thereby increasing the weight of the refuse vehicle. Despite such an increase in weight, a cantilevered loading configuration remains the traditional method for supporting the ejector of a refuse vehicle.

SUMMARY

One embodiment of the invention relates to an ejector for a refuse vehicle including a structural frame, a first shoe, and a second shoe. The structural frame includes a first side plate offset from a second side plate, and the distance between the first side plate and the second side plate defines a side plate spacing. The first shoe is coupled to the first side plate and includes a first surface configured to interface with a first ejector track. The second shoe is coupled to the second side plate and includes a second surface configured to interface with the second ejector track. A lateral spacing between the first surface and the second surface is less than or equal to the side plate spacing such that loading imparted on the structural frame is transmitted directly into the first ejector track and the second ejector track.

Another embodiment of the invention relates to a body assembly for a refuse vehicle. The body assembly includes a plurality of panels, a first ejector track, and a second ejector track. The plurality of panels define a chamber configured to contain a volume of refuse therein. The first ejector track is coupled to a first of the plurality of panels and includes a first upper wall including an outer edge and an inner edge and a first lower wall including an outer edge and an inner edge. The second ejector track is coupled to a second of the plurality of panels and offset from the first ejector track. The second ejector track includes a second upper wall including an outer edge and an inner edge and a second lower wall including an outer edge and an inner edge. The distance between the inner edge of the first upper wall and the inner edge of the second upper wall defines an upper wall spacing, and the distance between the inner edge of the first lower wall and the inner edge of the second lower wall defines a lower wall spacing. The upper wall spacing is greater than the lower wall spacing, and the first lower wall and the second lower wall define surfaces configured to directly support side plates of an ejector.

Still another embodiment of the invention relates to a refuse vehicle that includes a chassis, a body assembly, a ram, and a track. The body assembly is coupled to the chassis and includes a plurality of panels defining a chamber configured to contain a volume of refuse therein. The ram is positioned within the collection chamber and includes a side plate coupled to at least one of the plurality of panels with a shoe. The track is fixed to at least one of the plurality of panels and configured to receive the shoe. The track includes a lower wall positioned laterally below the side plate of the ram such that the forces and moments on the ram are transmitted directly into the track.

Yet another embodiment of the invention relates to a body assembly for a refuse vehicle. The body assembly includes a plurality of panels that extend along a longitudinal direction and define a chamber configured to contain a volume of refuse therein. The body assembly further includes a head wall extending laterally across the longitudinal direction. The head wall is coupled to the plurality of panels to form a corner. The corner is configured to receive an end of an actuator that compresses the volume of refuse.

The invention is capable of other embodiments and of being carried out in various ways. Alternative exemplary embodiments relate to other features and combinations of features as may be recited in the claims.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

The total weight of a refuse vehicle is regulated by local, state, or federal agencies defining a maximum gross vehicle weight (e.g., a maximum gross weight for a vehicle on certain roadways). Weight savings derived from the construction of the refuse vehicle thereby allows for a corresponding increase in the cargo capacity (e.g., as measured in terms of weight) of the vehicle. According to an exemplary embodiment, a refuse vehicle includes an ejector and a corresponding ejector track designed to reduce the magnitude of stresses carried by a body assembly of the vehicle. Reducing the magnitude of stresses carried by a body assembly of the vehicle reduces the requisite thickness of material, amount of bracing, and number of other structural supports, which reduces the weight of the ejector and body assembly and increases the cargo-capacity of the refuse vehicle.

Figure 1:
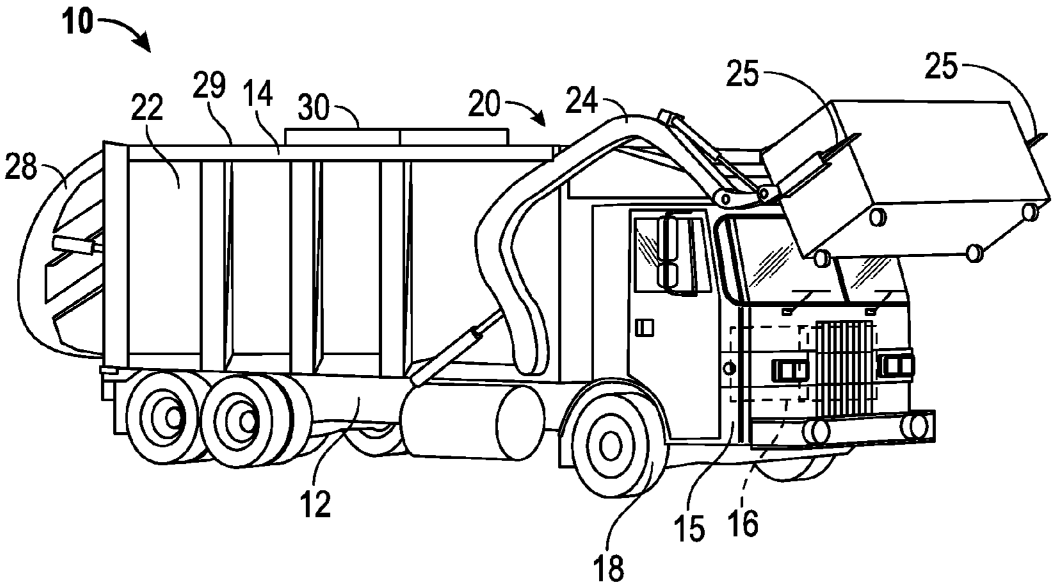
FIG. 1 is a perspective view of a front-loading refuse vehicle, according to an exemplary embodiment.
Figure 2:
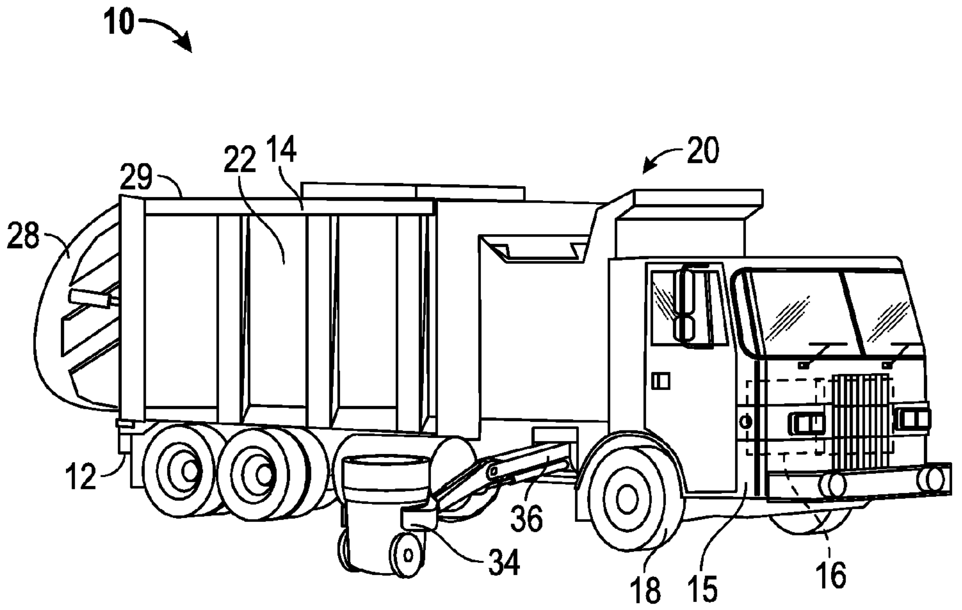
FIG. 2 is a perspective view of a side-loading refuse vehicle, according to an exemplary embodiment.

Referring to FIGS. 1-2, a vehicle, shown as refuse truck 10 (e.g., garbage truck, waste collection truck, sanitation truck, etc.), includes a chassis, shown as a frame 12, and a body assembly, shown as body 14, coupled to frame 12. As shown in FIGS. 1-2, refuse truck 10 also includes a cab 15 coupled to a front end of frame 12. Cab 15 includes various components to facilitate operation of refuse truck 10 by an operator (e.g., a seat, a steering wheel, hydraulic controls, etc.). Refuse truck 10 further includes a prime mover 16 coupled to frame 12 at a position beneath cab 15. Prime mover 16 provides power to a plurality of motive members, shown as wheels 18, and to other systems of the vehicle (e.g., a pneumatic system, a hydraulic system, etc.). Prime mover 16 may be configured to utilize a variety of fuels (e.g., gasoline, diesel, bio-diesel, ethanol, natural gas, etc.), according to various exemplary embodiments. According to an alternative embodiment, prime mover 16 is one or more electric motors coupled to frame 12. The electric motors may consume electrical power from an on-board storage device (e.g., batteries, ultra-capacitors, etc.), from an on-board generator (e.g., an internal combustion engine), or from an external power source (e.g., overhead power lines) and provide power to the systems of the refuse truck 10.

According to an exemplary embodiment, refuse truck 10 is configured to transport refuse from various waste receptacles within a municipality to a storage or processing facility (e.g., a landfill, an incineration facility, a recycling facility, etc.). As shown in FIGS. 1-2, body 14 includes panels 22, a tailgate 28, and a cover 29. Panels 22, tailgate 28, and cover 29 define a collection chamber, shown as a compartment 20. Loose refuse is placed into compartment 20 where it may be thereafter compacted. Compartment 20 provides temporary storage for refuse during transport to a waste disposal site or a recycling facility. In some embodiments, at least a portion of body 14 and compartment 20 extend in front of cab 15. According to the embodiment shown in FIGS. 1-2, body 14 and compartment 20 are positioned behind cab 15. In some embodiments, compartment 20 includes a hopper portion and a storage portion. Refuse is initially loaded into the hopper portion and thereafter compacted into the storage portion. According to an exemplary embodiment, the hopper portion is positioned between the storage portion and cab 15 (i.e. refuse is loaded into a position behind cab 15 and stored in a position further toward the rear of refuse truck 10).

Referring again to the exemplary embodiment shown in FIG. 1, refuse truck 10 is a front-loading refuse vehicle. As shown in FIG. 1, refuse truck 10 includes a pair of arms 24 coupled to frame 12 on either side of cab 15. Arms 24 may be rotatably coupled to frame 12 with a pivot (e.g., a lug, a shaft, etc.). In some embodiments, actuators (e.g., hydraulic cylinders, etc.) are coupled to frame 12 and arms 24, and extension of the actuators rotates arms 24 about an axis extending through the pivot. According to an exemplary embodiment, interface members, shown as forks 25, are coupled to arms 24. Forks 25 have a generally rectangular cross-sectional shape and are configured to engage a refuse container (e.g., protrude through apertures within the refuse container, etc.). During operation of refuse truck 10, forks 25 are positioned to engage the refuse container (e.g., refuse truck 10 is driven into position until forks 25 protrude through the apertures within the refuse container). As shown in FIG. 1, arms 24 are rotated to lift the refuse container over cab 15. A second actuator (e.g., a hydraulic cylinder) articulates forks 25 to tip the refuse out of the container and into the hopper portion of compartment 20 through an opening in cover 29. The actuator thereafter rotates arms 24 to return the empty refuse container to the ground. According to an exemplary embodiment, a top door 30 is slid along cover 29 to seal the opening thereby preventing refuse from escaping compartment 20 (e.g., due to wind, etc.).

Referring to the exemplary embodiment shown in FIG. 2, refuse truck 10 may be a side-loading refuse vehicle that includes a grabber 34 configured to interface with (e.g., engage, wrap around, etc.) a refuse container (e.g., a residential garbage can, etc.). According to the exemplary embodiment shown in FIG. 2, grabber 34 is movably coupled to body 14 with an arm 36. Arm 36 includes a first end coupled to body 14 and a second end coupled to grabber 34. An actuator (e.g., a hydraulic cylinder) articulates arm 36 and positions grabber 34 to interface with the refuse container. Arm 36 may be moveable within one or more directions (e.g., up and down, left and right, in and out, rotation, etc.) to facilitate positioning grabber 34 to interface with the refuse container. According to an alternative embodiment, grabber 34 is movably coupled to body 14 with a track. After interfacing with the refuse container, grabber 34 is lifted up the track (e.g., with a cable, with a hydraulic cylinder, with a rotational actuator, etc.). The track may include a curved portion at an upper portion of body 14 such that grabber 34 and the refuse container are tipped toward the hopper portion of compartment 20. In either embodiment, grabber 34 and the refuse container are otherwise tipped toward the hopper portion of compartment 20 (e.g., with an actuator, etc.). As grabber 34 is tipped, refuse falls through an opening in cover 29 and into the hopper portion of compartment 20. Arm 36 or the track then returns the empty refuse container to the ground, and top door 30 may be slid along cover 29 to seal the opening thereby preventing refuse from escaping compartment 20 (e.g., due to wind).

Figure 3:
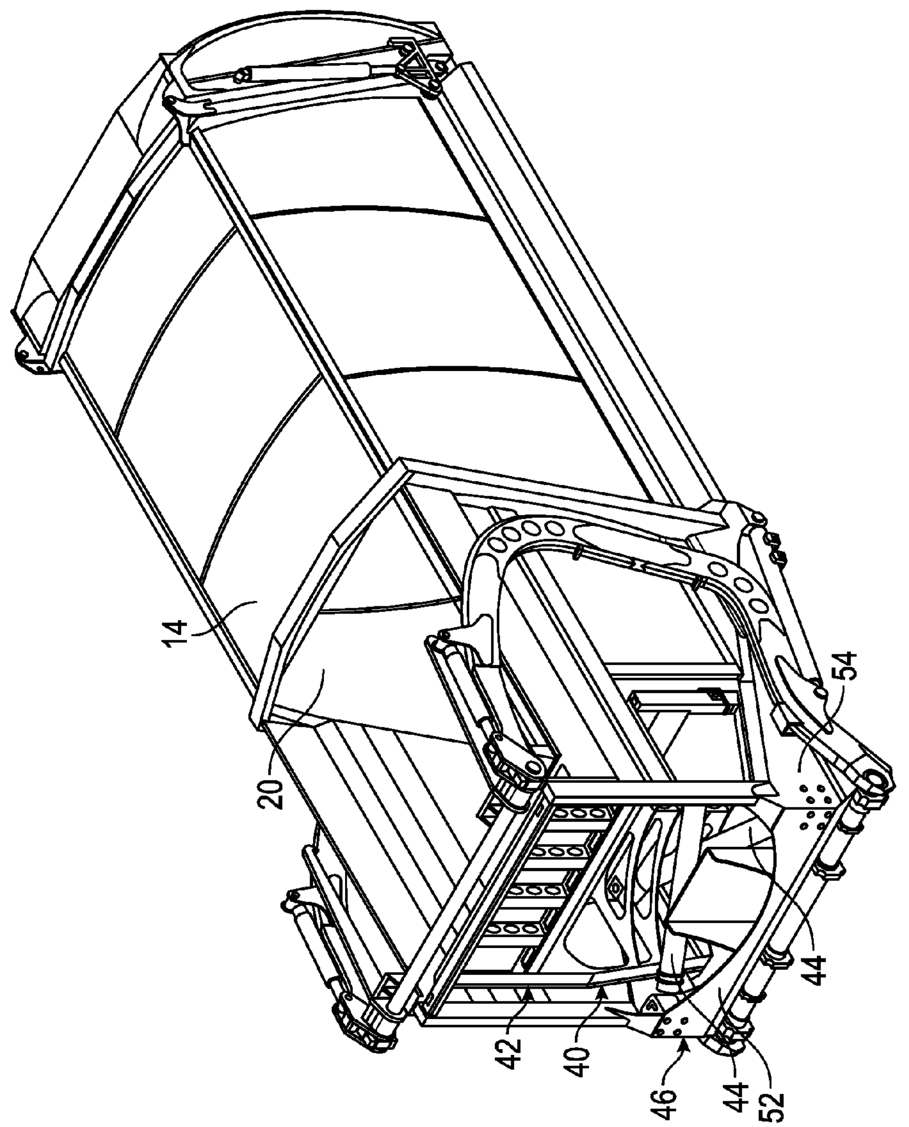
FIG. 3 is a front perspective view of a body for a refuse vehicle, according to an exemplary embodiment.

Referring next to FIG. 3, a compactor, shown as packer system 40 (e.g., press, compactor, packer, etc.), is positioned within compartment 20. According to an exemplary embodiment, packer system 40 is configured to compact the refuse within the hopper portion of compartment 20 into the storage portion of compartment 20 thereby increasing the carrying capacity of the refuse truck 10. In some embodiments, packer system 40 utilizes hydraulic power to compact the refuse from the hopper portion into the storage portion. As shown in FIG. 3, packer system 40 includes a ram, shown as ejector 42, and actuators, shown as hydraulic cylinders 44. Hydraulic cylinders 44 are coupled to ejector 42 and a frame member of body 14, shown as head wall 46. Head wall 46 is positioned along the cab of the refuse vehicle, according to an exemplary embodiment. According to an exemplary embodiment, the head wall 46 is a lightweight structure that includes an end wall 52 coupled to a pair of side gussets 54 at a pair of corners. Side gussets 54 couple end wall 52 with various lower frame members of body 14.

As shown in FIG. 3, hydraulic cylinders 44 are positioned to extend ejector 42 rearward away from head wall 46. In some embodiments, hydraulic cylinders 44 each include a first end coupled to one of the corners formed by end wall 52 and side gusset 54 and a second end coupled to ejector 42. According to an exemplary embodiment, hydraulic cylinders 44 extend diagonally such that the first end is coupled to end wall 52 at a first lateral side of body 14 and the second end is coupled to an opposite lateral side of ejector 42. The first end may be coupled to end wall 52 with a first pivoting bracket and the second end may be coupled to the ejector with a second pivoting bracket. According to an alternative embodiment, packer system 40 includes hydraulic cylinders 44 that extend longitudinally along a length of body 14. According to still other embodiments, packer system 40 includes a single actuator or another device to slide ejector 42 within compartment 20.

Figure 4:
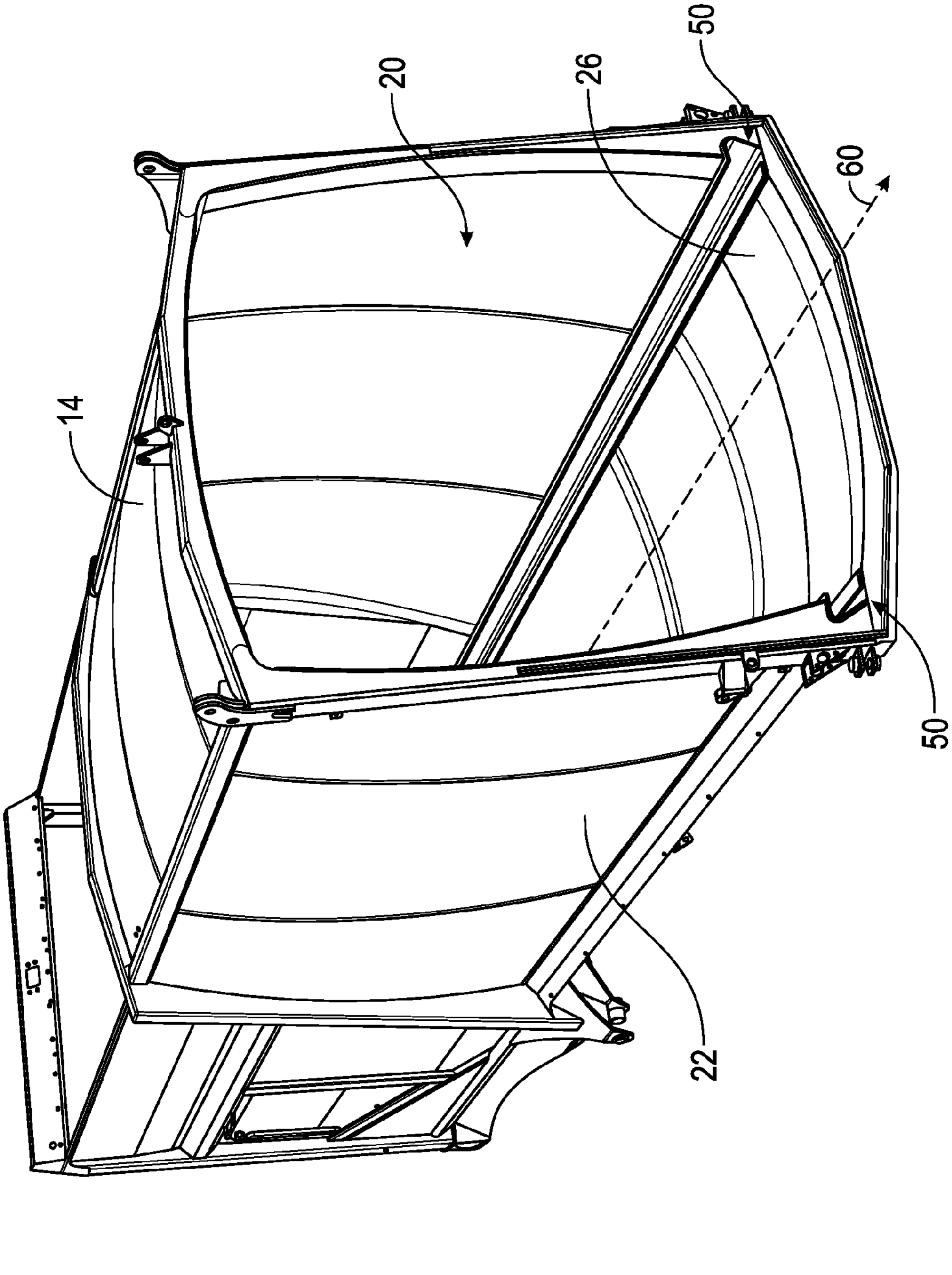
FIG. 4 is a rear perspective view of the body for a refuse vehicle, according to an exemplary embodiment.

Referring next to FIG. 4, the ram slides along a first track, shown as first rail 50, and a second track, shown as second rail 50. In some embodiments, first rail 50 and second rail 50 are integrally formed with body 14. In other embodiments, first rail 50 and second rail 50 are formed as sub-components and thereafter coupled (e.g., welded, bolted, etc.) to the other components of body 14. As shown in FIG. 4, first and second rails 50 extend along the length of compartment 20. According to an exemplary embodiment, body 14 includes a plurality of panels. In some embodiments, body 14 is shaped as a generally rectangular box having two transverse upper edges, two longitudinal upper edges, two transverse lower edges, and two longitudinal lower edges. The longitudinal edges extend along the length of body 14 (e.g., the longer dimension, along the longitudinal direction, along an axis extending parallel to frame 12, etc.) and the transverse edges extend across the length of body 14. According to the exemplary embodiment shown in FIG. 4, rails 50 extend along lower longitudinal edges of body 14.

Refuse is compacted from the hopper portion of compartment 20 to the storage portion of compartment 20 with a compacting stroke. During the compacting stroke, the ram (e.g., ejector 42) slides within compartment 20 on rails 50 along a longitudinal direction 60. As shown in FIG. 4, longitudinal direction 60 is parallel to the longitudinal direction of body 14. After the compacting stroke, the ram retracts by sliding within compartment 20 on rails 50 along a direction opposite longitudinal direction 60. Extension of the actuators forces the ram away from a front end of body 14, according to an exemplary embodiment. Such extension forces the ram against the refuse in the compartment 20, which compresses the refuse against a portion of body 14 (e.g., an inner surface of a panel, a tailgate, etc.). According to an exemplary embodiment, packer system 40 compacts the refuse towards the back of the compartment 20 (e.g., the end of body 14 opposite the cab) against the tailgate 28 (e.g., for a front-loading or side-loading truck). According to an alternative embodiment, the actuators are positioned such that the compactor forces refuse towards the front of compartment 20 and against a head wall (e.g., for a rear-loading truck). According to other exemplary embodiments, the compactor includes other components (e.g., a screw mechanism) configured to otherwise process (e.g., compact, shred, etc.) the refuse within compartment 20.

According to an exemplary embodiment, body 14 is rotatably coupled to the chassis of the refuse vehicle. An actuator may tip body 14 to empty refuse from the compartment 20 into another receptacle or collection area. According to an exemplary embodiment, body 14 is tipped backwards (e.g., the front end wall is lifted) with a hydraulic actuator (e.g., lift cylinders, dump cylinders, raise cylinders, etc.) to facilitate such an emptying operation. The tailgate may also be rotated with an actuator to expose the rear portion of compartment 20. According to an alternative embodiment, body 14 remains stationary, and the tailgate is lifted such that a rearward motion of the ram pushes refuse out from the compartment 20.

Referring again to the exemplary embodiment shown in FIG. 4, body 14 includes a floor 26 extending between rails 50. As shown in FIG. 4, floor 26 is concave and curves downward. According to an exemplary embodiment, floor 26 has a radius of curvature of between approximately 100 and 250 inches. In one embodiment, the floor 26 has a radius of curvature of 114 inches. The weight of body 14 having floor 26 is less than the weight of a traditional body assembly. Floor 26 provides a weight reduction in part due to the high strength-to-weight ratio of floor 26 relative to a traditional flat floor. The increased strength-to-weight ratio allows for the use of fewer lateral sub-frame members (e.g., cross members) and smaller longitudinal sub-frame members (e.g., ribs, rails, etc.), which decreases the overall weight of the body 14 without decreasing the refuse-carrying capabilities of refuse truck 10. The curvature reduces the peak stresses on floor 26 and reduces the displacement of cantilevered portions of floor 26 during loading. According to an exemplary embodiment, floor 26 is curved in both the hopper portion and in the storage portion of compartment 20. In some embodiments, floor 26 is curved along the entire length of body 14.

Figure 5:
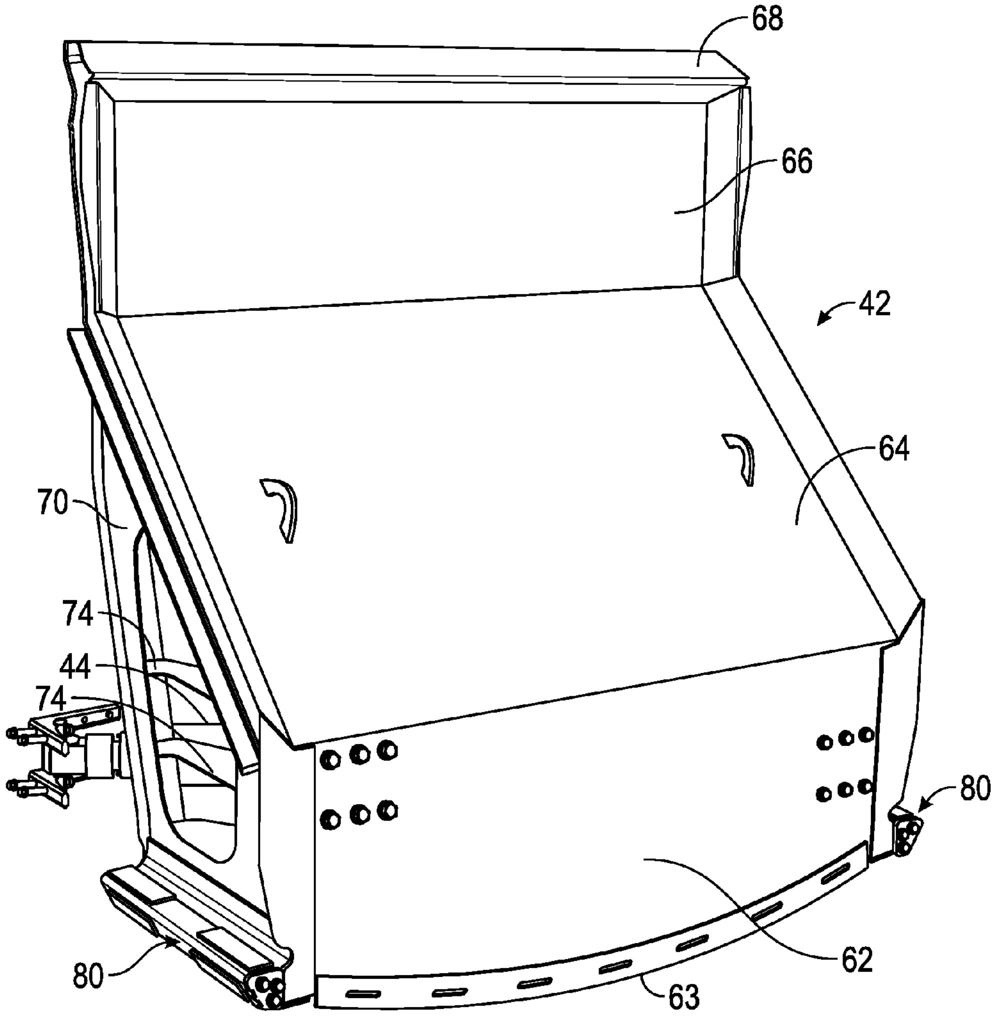
FIG. 5 is front perspective view of an ejector for a refuse vehicle, according to an exemplary embodiment.
Figure 6:
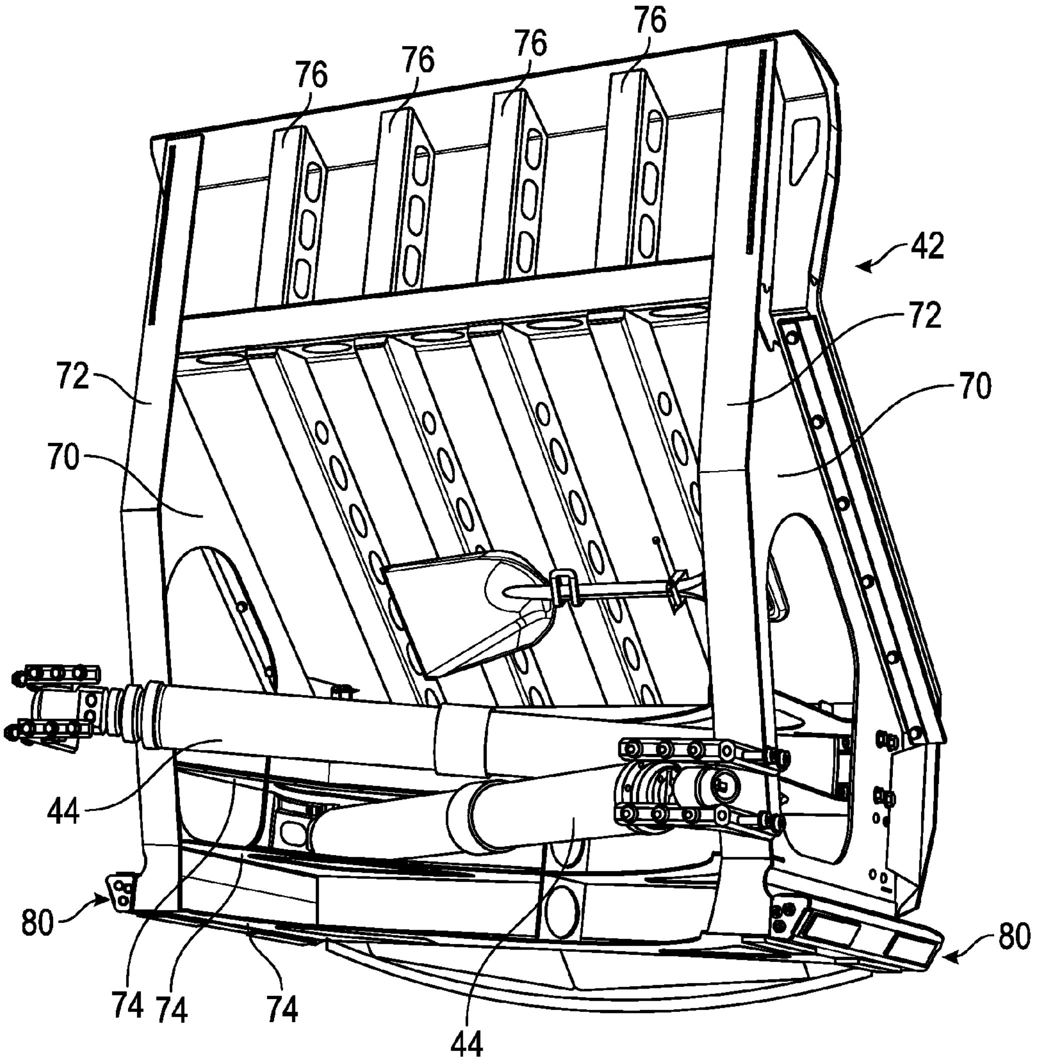
FIG. 6 is a rear perspective view of an ejector for a refuse vehicle, according to an exemplary embodiment.

Referring next to the exemplary embodiment shown in FIGS. 5-6, ejector 42 is a hollow, lightweight structure designed to reduce the weight of a refuse vehicle. According to an exemplary embodiment, ejector 42 includes a plurality of assembled plates. Such plates may be metal (e.g., steel, aluminum, etc.), a polymeric material, or a composite material, among other alternatives. As shown in FIGS. 5-6, ejector 42 comprises a plurality of steel plates welded together. In other embodiments, ejector 42 is manufactured according to a different process (e.g., a cast assembly, plates bolted or otherwise coupled together, etc.).

As shown in FIGS. 5-6, the plates of ejector 42 define a plurality of surfaces. According to an exemplary embodiment, ejector 42 defines a packing face 62. When positioned in a refuse vehicle, packing face 62 extends within a plane that is orthogonal to the longitudinal direction of the body assembly. Ejector 42 further defines an angled face 64 that is angularly offset from packing face 62 (e.g., oriented at an angle of between 20 and 60 degrees relative to packing face 62). As shown in FIG. 5, ejector 42 also defines an upper front face 66 and a top shelf 68. A pair of side plates 70 extend along the longitudinal direction of the body assembly within planes that are perpendicular to packing face 62, according to an exemplary embodiment. As shown in FIG. 6, the pair of side plates 70 are laterally spaced apart from one another, the distance therebetween defining a side plate spacing.

With ejector 42 in a retracted position (e.g., in a position toward the front of the body assembly), refuse emptied into the hopper portion of the collection chamber contacts angled face 64, upper front face 66, and top shelf 68. The refuse thereafter falls into the collection chamber of the body assembly. Extension of hydraulic cylinders 44 slides ejector 42 rearward such that packing face 62, angled face 64, and upper front face 66 compress the refuse within the collection chamber. As shown in FIGS. 5-6, packing face 62 has a lower edge 63 shaped to correspond with the shape of a floor within the body assembly of the refuse vehicle. Lower edge 63 reduces the amount of refuse that migrates behind ejector 42 during extension and refraction of hydraulic cylinders 44. According to an exemplary embodiment, ejector 42 further includes a frame 72, braces 74, and ribs 76. As shown in FIG. 6, frame 72, braces 74, and ribs 76 are positioned to transfer loading between (i.e. tie together, support, facilitate interaction between, etc.) the various plates of ejector 42 (e.g., the plates that define packing face 62, angled face 64, upper front face 66, top shelf 68, and side plates 70). According to an exemplary embodiment, frame 72, braces 74, and ribs 76 include a plurality of openings intended to reduce the weight of ejector 42.

According to an exemplary embodiment, ejector 42 further includes shoes, shown as projections 80. As shown in FIGS. 5-6, projections 80 extend laterally outward from side plates 70. According to an exemplary embodiment, projections 80 are positioned at a lower end of side plates 70 (e.g., the end of side plates 70 along lower edge 63). In some embodiments, projections 80 extend along the entire thickness of ejector 42. In other embodiments, ejector 42 includes multiple projections 80 coupled to each side plate 70 (e.g., a pair of projections 80 on each lateral side of ejector 42).

Figure 7:
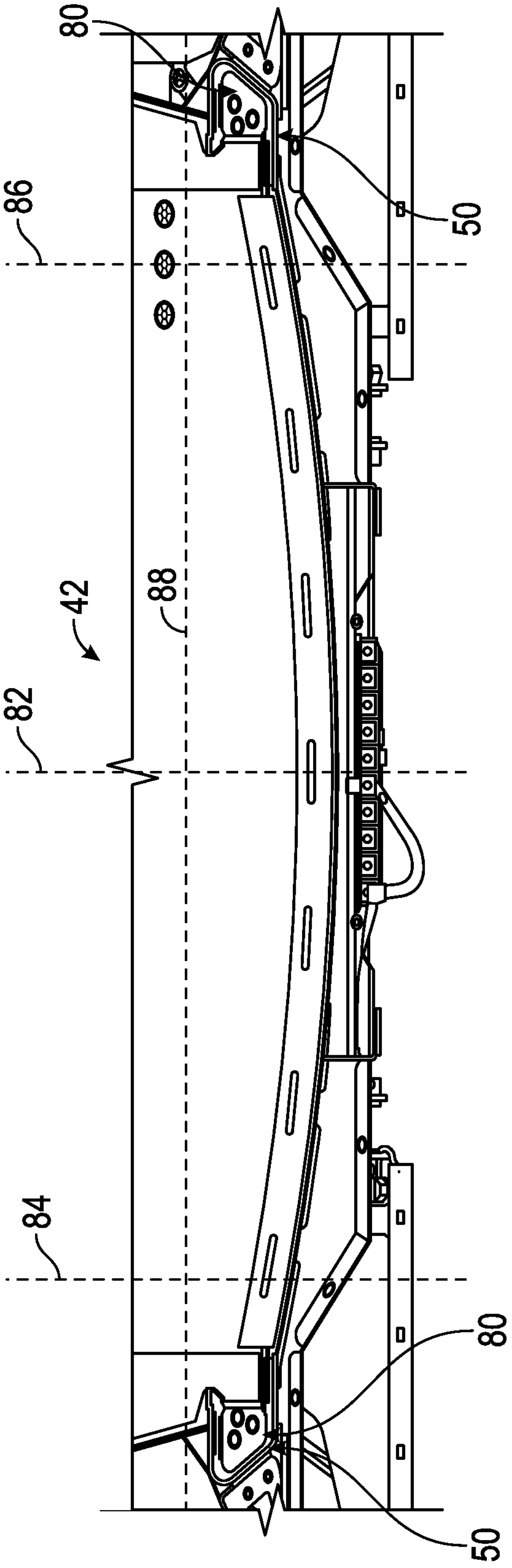
FIG. 7 is a partial sectional view of the body of a refuse vehicle showing the ejector rails, according to an exemplary embodiment.

Referring next to FIG. 7, projections 80 are received into rails 50 such that ejector 42 may slide within the collection chamber of the body assembly (e.g., for compaction of the refuse, for retracting ejector 42, etc.). Compaction of refuse imparts various forces and moments on ejector 42. By way of example, twisting moments may occur about a first vertical axis 82, a second vertical axis 84, or a third vertical axis 86. While first vertical axis 82, second vertical axis 84, and third vertical axis 86 have been specifically described, twisting moments may occur about still other axes. Compaction may also impart tipping moments on ejector 42, which may occur about lateral axis 88. While lateral axis 88 has been specifically described, tipping moments may occur about still other axes.

Refuse may be unevenly distributed within the collection chamber of the body assembly (e.g., due to loading from only one lateral side of the refuse truck). By way of example, a first lateral side of the collection chamber may have refuse therein whereas a second lateral side of the collection chamber may be relatively free of refuse. Uneven distribution of the refuse may also occur due to the composition of the refuse whereby a first lateral side of the collection chamber includes stiff materials (e.g., metal products, plastic products, etc.) and a second lateral side of the collection chamber includes pliable materials (e.g., paper products, etc.). Extension of the actuators applies compaction forces to the first and second lateral sides of ejector 42. The application of such compaction forces to unevenly distributed refuse causes a twisting moment about at least one of first vertical axis 82, second vertical axis 84, and third vertical axis 86 (e.g., relatively dense refuse on the side of ejector 42 at second vertical axis 84 may cause a twisting moment about second vertical axis 84).

Refuse may be similarly unevenly distributed vertically within the collection chamber of the body assembly. By way of example, such uneven distribution may occur as denser refuse settles to the bottom of the collection chamber (e.g., as the refuse vehicle moves). Extension of the actuators applies compaction forces to ejector 42 at a fixed vertical position (e.g., where the actuators are coupled to ejector 42). An uneven distribution of refuse produces a tipping moment about a horizontal axis (e.g., lateral axis 88).

Such forces and moments are transferred through projections 80 into rails 50 and the body assembly of the refuse vehicle. According to an exemplary embodiment, the combination of projections 80 and rails 50 is intended to maintain linear movement of ejector 42 (e.g., prevent ejector 42 from tipping over). The actuators coupled to ejector 42 may impart large forces to compact the refuse positioned within the collection chamber. Such large forces produce large twisting and tipping moments, which are carried by projections 80 and rails 50.

Figure 8:
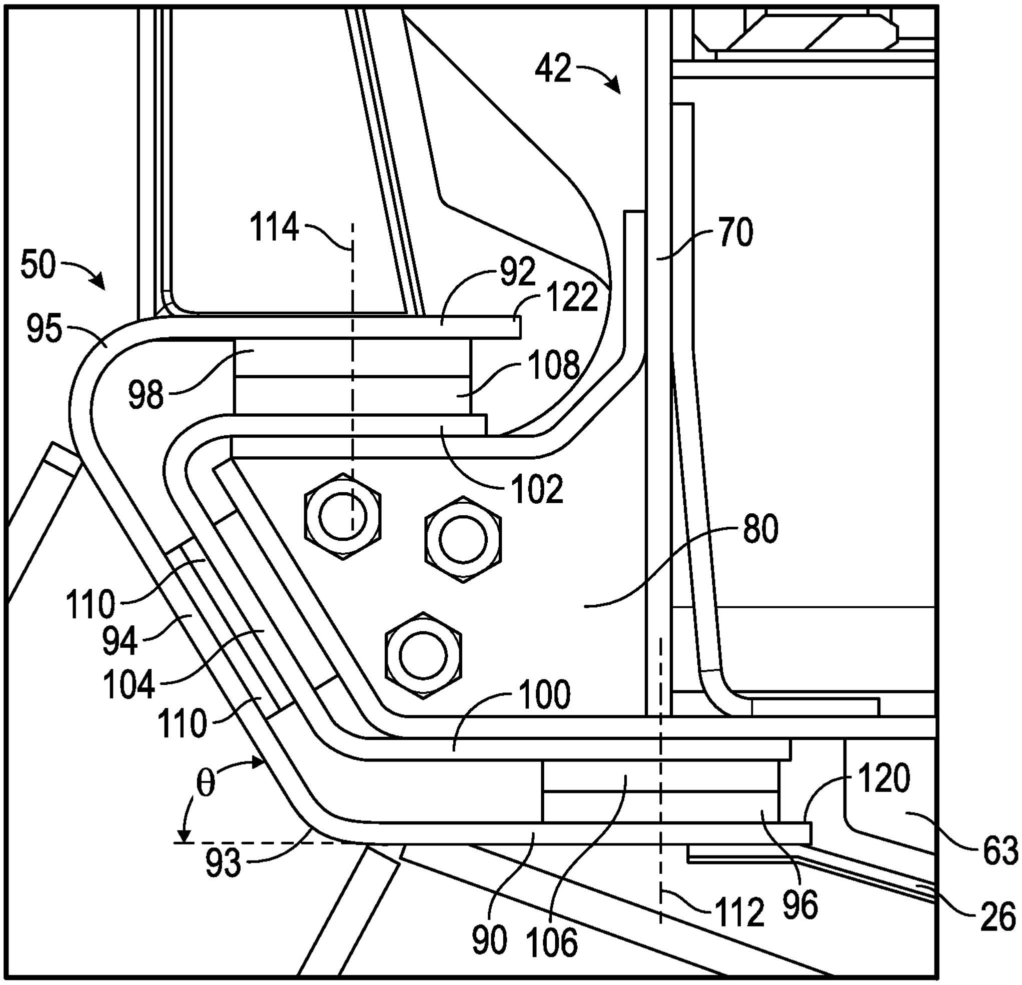
FIG. 8 is a detail sectional view of the ejector received in a rail of the body for a refuse vehicle, according to an exemplary embodiment.

Referring next to the detail view to FIG. 8, one projection 80 of ejector 42 is shown, according to an exemplary embodiment. As shown in FIG. 8, projection 80 is received into rail 50. According to an exemplary embodiment, rail 50 is an angled channel structure and includes a lower wall 90, an upper wall 92, and a sidewall 94 extending between lower wall 90 and upper wall 92. As shown in FIG. 8, upper wall 92 is laterally offset from lower wall 90 (e.g., upper wall 92 is positioned further from a centerline of ejector 42 than lower wall 90). In some embodiments, sidewall 94 is angularly offset from lower wall 90. As shown in FIG. 8, sidewall 94 is offset at an acute angle, shown as angle θ, relative to the horizontally positioned lower wall 90. In some embodiments, angle θ is between 45 and 75 degrees. According to an exemplary embodiment, angle θ is approximately 60 degrees.

Rail 50 is manufactured (e.g., bent from a sheet of material) such that sidewall 94 is coupled to lower wall 90 with a first arcuate portion 93 and coupled to upper wall 92 with a second arcuate portion 95, according to an exemplary embodiment. As shown in FIG. 8, first arcuate portion 93 and the second arcuate portion have a radius of approximately one inch. Rail 50 reduces the weight of ejector 42 and the body assembly of the refuse vehicle. By way of example, angling sidewall 94 reduces the cross-sectional length of lower wall 90, upper wall 92, and sidewall 94 relative to an ejector track having a lower wall 90 extending laterally outward until sidewall 94 is positioned vertically (i.e. rail 50 is lower-weight than traditional "C" channel designs).

Referring again to the detail view shown in FIG. 8, projection 80 nests within rail 50 to facilitate relative movement between ejector 42 and the body assembly of the refuse vehicle. According to an exemplary embodiment, projection 80 includes a lower wall 100, an upper wall 102, and an angled sidewall 104 coupling the lower wall 100 to the upper wall 102. As shown in FIG. 8, interface members, shown as wear pads, are positioned between projection 80 and rail 50. Such interface members reduce the friction forces opposing the movement of ejector 42 and reduce the risk of damage to projection 80 (e.g., by providing replaceable contact surfaces). According to an exemplary embodiment, a lower wear pad 96 is coupled to lower wall 90 and an upper wear pad 98 is coupled to upper wall 92, a lower wear pad 106 is coupled to lower wall 100 of projection 80 and an upper wear pad 108 is coupled to upper wall 92 of projection 80, and a pair of angled wear pads 110 are positioned between sidewall 94 and sidewall 104. Lower wear pad 96 interfaces with lower wear pad 106, upper wear pad 98 interfaces with upper wear pad 108, and angled wear pads 110 interface with one another during operation of ejector 42 (e.g., compaction, retraction, etc.). In other embodiments, a single wear pad is positioned between lower wall 90 and lower wall 100, upper wall 92 and upper wall 102, and sidewall 94 and sidewall 104 (i.e. a single wear pad may replace separate wear pads). The single wear pad may be coupled to one wall and interface with (e.g., slide along) the other, corresponding wall.

According to an exemplary embodiment, a centerline of lower wear pad 96 and lower wear pad 106 defines a central axis 112. While central axis 112 is shown in FIG. 8 as a line, central axis 112 may extend along the length of lower wear pad 96 and lower wear pad 106 thereby defining a central plane. As shown in FIG. 8, the centerlines of both lower wear pad 96 and lower wear pad 106 are positioned along the same central axis 112. In other embodiments, lower wear pad 96 may be offset from lower wear pad 106 (e.g., positioned laterally inward and closer to a centerline of ejector 42, etc.). As shown in FIG. 8, a centerline of upper wear pad 98 and upper wear pad 108 defines a central axis 114. While central axis 114 is shown in FIG. 8 as a line, central axis 114 may extend along the length of upper wear pad 98 and upper wear pad 108 thereby defining a central plane. As shown in FIG. 8, the centerlines of both upper wear pad 98 and upper wear pad 108 are positioned along the same central axis 114. In other embodiments, upper wear pad 98 may be offset from upper wear pad 108 (e.g., positioned laterally inward and closer to a centerline of ejector 42, etc.).

As shown in FIG. 8, an inner edge 120 of lower wall 90 is positioned laterally inward from central axis 112 (e.g., relative to a centerline of ejector 42), and an inner edge 122 of upper wall 92 is also positioned laterally inward from central axis 114. Inner edge 120 of lower wall 90 is positioned laterally inward relative to inner edge 122 of upper wall 92. According to an exemplary embodiment, inner edge 120 is positioned such that lower wall 90 provides a surface to which lower wear pad 96 is coupled. Inner edge 122 is positioned to facilitate movement of (e.g., not interfere with) ejector 42.

According to an exemplary embodiment, the interface members are replaceable and provide bearing surfaces to allow ejector 42 to slide along rails 50 without direct contact between the metal structures of ejector 42 and rails 50. In other embodiments, ejector 42 may slide directly upon rails 50. In still other embodiments, a different mechanism facilitates movement between ejector 42 and rails 50 (e.g., rollers, low-friction surfaces, etc.). According to an exemplary embodiment, the interface members are manufactured from a material with a high wear resistance and a low coefficient of friction. According to an exemplary embodiment, the interface members are manufactured from a polymeric material (e.g., nylon). In one embodiment, the interface members are manufactured from self-lubricating nylon polymers (e.g., Nylatron®, etc.). The interface members are removably coupled to projections 80 and to rails 50 such that they may be replaced as they wear (e.g., coupled with bolts, rivets, etc.).

In some embodiments, a plurality of discrete interface members are provided along the length of rails 50 and projections 80. The interface members may be dimensioned and spaced to maintain contact between the interface members on projection 80 and those on rails 50 as ejector 42 moves along the length of the rails 50. According to other exemplary embodiments, the interface members on projections 80 and rails 50 are continuous strips. As shown in FIG. 8, the interface members (e.g., lower wear pad 96) include multiple individual pads stacked together. Such stacking allows for an increased thickness and increased life for the interface members. The thickness of the stack of individual pads may be selected to reduce movement of ejector 42 relative to rails 50 (e.g., twisting, tipping). In other embodiments, a single interface member (i.e. not a stack) is positioned between rail 50 and ejector 42. The thickness of the single interface member may be selected to reduce movement of ejector 42 relative to rails 50.

Extension of the actuators forces ejector 42 into the refuse within the collection chamber. Uneven loading of the refuse within the collection chamber may produce twisting moments and tipping moments on ejector 42. Such twisting and tipping moments are resisted by contact between lower wear pad 96, upper wear pad 98, and angled wear pad 110 with lower wear pad 106, upper wear pad 108, and the second angled wear pad 110, respectively. Such twisting and tipping moments may cause asymmetrical loading on the interface members. By way of example, a forward tipping moment (e.g., where an upper end of ejector 42 is tipped toward the cab of the refuse vehicle) drives the rearward end of projection 80 upward into rail 50 and drives the forward end of projection 80 downward into rail 50. Such forces may be conveyed between projection 80 and rails 50 through the interface members, according to an exemplary embodiment.

Referring again to FIG. 8, lower wear pad 96 and lower wear pad 106 are positioned below side plates 70 of ejector 42. In some embodiments, central axis 112 is laterally aligned with side plates 70 of ejector 42. According to another exemplary embodiment, central axis 112 is slightly offset from side plates 70 (e.g., where side plates 70 are laterally aligned with at least a portion of the interface members). Vertical forces on the ejector 42 (e.g., from a tipping moment, due to the weight of ejector 42, due to the force from refuse contacting the faces of ejector 42 during loading, etc.) are transmitted through the side plates 70. Ejector 42 and rails 50 transmit such vertical forces from side plates 70 directly downward into rails 50 through lower wear pad 106 and lower wear pad 96. Ejector 42 and rails 50 avoid cantilevered loading and corresponding bending stresses resulting therefrom. According to one embodiment, the total stresses imparted on ejector 42 and rails 50 during operation of the compactor, the requisite thicknesses of material and number of structural supports, and the weight of the refuse vehicle are reduced.

Uneven loading between the two lateral sides of ejector 42 (e.g., due to an uneven distribution of refuse in the collection chamber, due to an uneven composition of refuse in the compartment 20, due to an uneven pressure applied by the hydraulic cylinders 44, etc.) produces a twisting moment on ejector 42. Twisting moments are resisted by the contact between the angled wear pads 110 and the upper wear pad 98 with the upper wear pad 108. Angling sidewalls 94 and sidewalls 104 centers ejector 42 within the collection chamber (e.g., laterally centers, etc.) thereby reducing the risk of unevenly wearing angled wear pads 110, upper wear pads 98, and upper wear pads 108.

The construction of the body assembly and compactor is intended to reduce the overall weight of the refuse vehicle, thereby allowing for an increase in the maximum refuse carrying capacity without exceeding gross vehicle weight regulations imposed on some roadways. A reduced number of components simplifies fixture designs and increases the ease of manufacturing. Support below the side plates of the ejector instead of in a cantilevered position allows for the direct transfer of vertical loads into the frame of the vehicle thereby reducing stresses on the ejector and the body.

The construction and arrangements of the refuse vehicle, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions and arrangement of the various exemplary embodiments without departing from the scope of the present invention.

What is claimed is:

1. A refuse vehicle, comprising:

a chassis;

a body assembly coupled to the chassis, the body assembly including a plurality of panels defining a chamber configured to contain a volume of refuse therein;

a ram positioned within the chamber, the ram including a side plate coupled to at least one of the plurality of panels with a shoe;

a first track fixed to at least one of the plurality of panels and configured to receive the shoe, wherein the first track includes an upper wall and a lower wall, the lower wall positioned laterally below the side plate of the ram such that the forces and moments on the ram are transmitted directly into the first track; and a second track fixed to another of the plurality of panels and offset from the first track, the second track including an upper wall and a lower wall;

wherein a distance between inner edges of the upper walls of the first track and the second track defines an upper wall spacing, wherein a distance between inner edges of the lower walls of the first track and the second track defines a lower wall spacing, and wherein the upper wall spacing is greater than the lower wall spacing.

2. The refuse vehicle of claim 1, the ram including a second side plate offset from the first side plate, a distance between the first side plate and the second side plate defining a side plate spacing.

3. The refuse vehicle of claim 2, further comprising a second shoe coupled to the second side plate and a second track configured to receive the second shoe, wherein the first shoe defines a first surface configured to interface with a first track and the second shoe defines a second surface configured to interface with the second track.

4. The refuse vehicle of claim 3, wherein a lateral spacing between the first surface and the second surface is less than or equal to the side plate spacing.

5. The refuse vehicle of claim 3, further comprising a first interfacing member coupled to the first surface and a second interfacing member coupled to the second surface.

6. The refuse vehicle of claim 5, a distance between the first interfacing member and the second interfacing member defining an interface spacing, wherein the interface spacing is substantially equal to the side plate spacing such that forces and moments on the ram are transmitted directly into the track through the first interfacing member and the second interfacing member.

7. The refuse vehicle of claim 6, wherein the first interfacing member and the second interfacing member are wear pads.

8. The refuse vehicle of claim 1, further comprising a first interfacing member coupled to the lower wall of the first track and a second interfacing member coupled to the lower wall of the second track, wherein a distance between the first interfacing member and the second interfacing member defines an interface spacing, and wherein the upper wall spacing is greater than the interface spacing.

9. The refuse vehicle of claim 1, wherein the lower walls of the first track and the second track define surfaces, and wherein at least one of the surfaces is configured to directly support the side plate of the ram.

10. The refuse vehicle of claim 9, wherein the plurality of panels extend along a longitudinal direction, two of the plurality of panels including a first lower edge and a second lower edge that are parallel to the longitudinal direction.

11. The refuse vehicle of claim 10, wherein the first track is positioned along the first lower edge and the second track is positioned along the second lower edge.

12. The refuse vehicle of claim 9, the first track further comprising a first sidewall coupling an outer edge of the upper wall of the first track to an outer edge of the lower wall of the first track, and the second track further comprising a second sidewall coupling an outer edge of the upper wall of the second track to an outer edge of the lower wall of the second track.

13. The refuse vehicle of claim 12, wherein the first sidewall and the second sidewall are angled such that the outer edges of the upper walls of the first track and the second track are positioned laterally outward of the outer edges of the lower walls of the first track and the second track.

14. The refuse vehicle of claim 1, wherein the plurality of panels extend along a longitudinal direction, and wherein the body assembly further comprises a head wall extending laterally across the longitudinal direction and coupled to the plurality of panels to form a corner, wherein the corner is configured to receive an end of an actuator that compresses the volume of refuse.

* * * * *